United States Patent [19]

Fishback et al.

[11] Patent Number: 6,020,451
[45] Date of Patent: Feb. 1, 2000

[54] COMPOSITIONS OF POLYTETRAMETHYLENE ETHER GLYCOLS AND POLYOXYALKYLENE POLYOLS HAVING A LOW DEGREE OF UNSATURATION

[75] Inventors: Thomas L. Fishback, Gibraltar; Curtis J. Reichel; Thomas B. Lee, both of Southgate, all of Mich.

[73] Assignee: BASF Corporation, Mt. Olive, N.J.

[21] Appl. No.: 08/902,873

[22] Filed: Jul. 30, 1997

Related U.S. Application Data

[62] Division of application No. 08/678,028, Jul. 10, 1996.
[51] Int. Cl.⁷ .................................................. C08G 18/48
[52] U.S. Cl. ............................. 528/76; 528/417; 525/409; 525/410
[58] Field of Search ..................... 528/76, 417; 525/409, 525/410

[56] References Cited

U.S. PATENT DOCUMENTS

| | | | |
|---|---|---|---|
| 3,829,505 | 8/1974 | Herold | 568/606 |
| 3,963,681 | 6/1976 | Kaneko | 528/61 |
| 4,686,137 | 8/1987 | Ward | 428/290 |
| 5,389,430 | 2/1995 | Yilgor | 428/246 |
| 5,545,706 | 8/1996 | Barksby | 528/49 |
| 5,691,441 | 11/1997 | Seneker | 528/61 |

*Primary Examiner*—Patricia A. Short
*Attorney, Agent, or Firm*—Fernando A. Borrego

[57] ABSTRACT

Thus, there is provided according to the present invention polyol compositions comprising
(A) a polytetramethylene ether glycol, and
(B) a difunctional active hydrogen compound-initiated polyoxyalkylene polyether polyol having a degree of unsaturation of not greater than 0.04 milliequivalents per gram of said polyether polyol.

20 Claims, No Drawings

COMPOSITIONS OF POLYTETRAMETHYLENE ETHER GLYCOLS AND POLYOXY ALKYLENE POLYETHER POLYOLS HAVING A LOW DEGREE OF UNSATURATION

This is a divisional of application Ser. No. 08/678,028 filed Jul. 10, 1996, now pending.

FIELD OF THE INVENTION

This invention relates to blends of poly-tetramethylene polyether glycols and polyoxyalkylene polyether polyols having a low degree of unsaturation of 0.04 or less, and to the cast elastomers, spandex fibers, and thermoplastic polyurethanes made therefrom.

BACKGROUND OF THE INVENTION

Polyurethane elastomers often utilize one or more polytetramethylene ether glycols (PTMEG's) as a polyol component to react with one or more polyisocyanates such as MDI because they can impart to the elastomer the high level of mechanical properties required for specific applications. PTMEG's are often used for such applications where high tensile strength, low compression set, high resilience, and/or a high modulus of elasticity are required. PTMEG's, however, can be difficult and expensive to make due to the availability of starting materials and the formation of undesired side-reaction products during synthesis.

It would therefore be desirable to provide polyol compositions that can be used to manufacture high-quality polyurethane elastomers while reducing the amount of PTMEG required.

SUMMARY OF THE INVENTION

Thus, there is provided according to the present invention polyol compositions comprising
(A) a polytetramethylene ether glycol, and
(B) a difunctional active hydrogen compound-initiated polyoxyalkylene polyether polyol having a degree of unsaturation of not greater than 0.04 milliequivalents per gram of said polyether polyol.

The polyol compositions according to the present invention can be used for the manufacture of polyurethane elastomers via a one-shot technique or a prepolymer technique. Elastomers based on the polyol compositions of the invention exhibit a good combination of properties such as tensile strength, compression set, resilience, and/or a modulus of elasticity, which often previously required the use pure PTMEG. Other properties, such as elongation and resilience, can often be improved by utilizing the blend compositions of the invention.

Thus, in one embodiment of the invention, there is provided a prepolymer obtained by reacting a polyol composition comprising at least the above-described PTMEG and a polyoxyalkylene polyether polyol having a degree of unsaturation of 0.04 or less, with an organic polyisocyanate. The prepolymer may be isocyanate terminated by adding a sub-stoichiometric amount of the polyol composition to the isocyanate, or hydroxyl terminated by adding to the isocyanate a molar excess of the polyol composition.

In another embodiment of the invention, there is provided an elastomer made by reacting an organic di- or polyisocyanate with the polyol composition, optionally in the presence of a hydroxyl and/or amine functional chain extender at an equivalent NCO:OH ratio of at least 1.5:1, where the polyol composition is made up of at least PTMEG and a polyoxyalkylene polyether polyol having a degree of unsaturation of 0.04 or less. The polyol composition of the invention may be a principal polyol component of the urethane elastomer-forming reaction mixture (i.e., one-shot method) or it may first be incorporated into a prepolymer prior to incorporation into the urethane elastomer-forming reaction (i.e., prepolymer methods).

DESCRIPTION OF THE PREFERRED EMBODIMENTS

PTMEG's useful in the practice of the invention generally have a number average molecular weight ranging from 500 to 5000, preferably 800 to 3000, more preferably from 1000 to 2600. Techniques for the manufacture of PTMEG are well-known in the art, such as described in U.S. Pat. Nos. 4,294,997 and 4,213,000, the disclosures of which are incorporated herein by reference. Examples of useful PTMEG's include POLYTHF® 650, POLYTHF® 1000, POLYTHF® 2000, and POLYTHF® 2900.

PTMEG's are generally synthesized by a ring-opening chain extension reaction of the monomeric tetrahydrofuran (THF). In one well-known method, the ring-opening reaction is catalyzed by fluorosulfonic acid, followed by hydrolysis of sulfate ester groups and water extraction of the acid, followed by neutralization and drying. In many cases, the PTMEG will be solid at room temperature because of its high degree of crystallinity. In the event one desires to employ a room temperature liquid PTMEG, the THF can be copolymerized with alkylene oxides (also known as cyclic ethers or monoepoxides) as suggested in U.S. Pat. No. 4,211,854, incorporated herein by reference. Such copolymers have an A-B-A block-heteric structure, wherein the A blocks are random copolymers of tetrahydrofuran and alkylene oxides, and the B block is made up of polytetramethylene oxides.

The cyclic ethers copolymerizable with tetrahydrofuran are not particularly limited, provided that they are cyclic ethers capable of ring-opening polymerization, and may include, for example, 3-membered cyclic ethers, 4-membered cyclic ethers, cyclic ethers such as tetrahydrofuran derivatives, and cyclic ethers such as 1,3-dioxolan, trioxane, etc. Examples of cyclic ethers include ethylene oxide 1,2-butene oxide, 1,2-hexene oxide, 1,2-tert-butyl ethylene oxide, cyclohexene oxide, 1,2-octene oxide, cyclohexylethylene oxide, styrene oxide, phenyl glycidyl ether, allyl glycidyl ether, 1,2-decene oxide, 1,2-octadecene oxide, epichlorohydrin, epibromohydrin, epiiodohydrin, perfluoropropylene oxide, cyclopentene oxide, 1,2-pentene oxide, propylene oxide, isobutylene oxide, trimethyleneethylene oxide, tetramethyleneethylene oxide, styrene oxide, 1,1-diphenylethylene oxide, epifluorohydrin, epichlorohydrin, epibromohydrin, epiiodohydrin, 1,1,1-trifluoro-2-propylene oxide, 1,1,1-trifluoro-2-methyl-2-propylene oxide, 1,1,1-trichloro-2-methyl-3-bromo-2-propylene oxide, 1,1,1-tribromo-2-butyleneoxide, 1,1,1-trifluoro-2-butyleneoxide, 1,1,1-trichloro-2-butylene oxide, oxetane, 3-methyloxetane, 3,,3-dimethyloxetane, 3,3-diethyloxetane, 3,3-bis (chloromethyl)oxetane, 3,3-bis(bromomethyl)oxetane, 3,3-bis(iodomethyl)oxetane, 3,3-bis(fluoromethyl)oxetane, 2-methyltetrahydrofuran, 3-methyltetrahydrofuran, 2-methyl-3-chloromethyltetrahydrofuran, 3-ethyltetrahydrofuran, 3-isopropyltetrahydrofuran, 2-isobutyltetrahydrofuran, 7-oxabicyclo(2,2,1)heptane, and the like.

The content of the copolymerized cyclic ether, if present, in a PTMEG may be within the range of from 5 to 95% by weight, but when obtaining a copolymerized polyetherglycol containing oxytetramethylene groups as a main component which is effective as the soft segment in a polyurethane elastomer such as spandex, the amount of the cyclic ether in the A block copolymerizable with THF is generally from 30 to 70 weight %. In the event one chooses to randomly copolymerize cyclic ethers with THF across the whole copolymer, the amount of cyclic ether may range from 5 to 60 weight % of the copolymer.

Additionally, in the synthesizing reaction of PTMEG, a part of the starting THF may be replaced with an oligomer of PTMEG as the starting material. Further, in the synthesizing reaction of a copolymerized polyetherglycol, an oligomer of PTMEG or an oligomer of the polyetherglycol to be synthesized may also be added as a part of the starting material to carry out the reaction. In such a case, the oligomer generally has a molecular weight lower than the polymer to be synthesized. More specifically, one may use an oligomer having a number-average molecular weight within the range of from 100 to 800 when synthesizing a polymer with a number-average molecular weight of 1000 or more, and an oligomer with a number-average molecular weight of 100 to 2000 when synthesizing a polymer with a number-average molecular weight of 3000 or more. Also, an oligomer separated by fractional extraction or vacuum distillation from the PTMEG or the copolymerized polyetherglycol synthesized may be employed. Such an oligomer may be added in an amount of up to 10% by weight into the starting monomer.

The degree of polymerization tends to decrease as the reaction temperature is increased and therefore, and also in view of the polymerization yield, the polymerization temperature should preferably be −10° to 120° C., more preferably 30° to 80° C. If the temperature exceeds 120° C., the yield decreases. The time required for the reaction is generally 0.5 to 20 hours, although it may vary depending upon the catalyst amount and the reaction temperature. The reaction may be carried out in any system generally employed such as tank type or tower type vessel. It is also feasible by either batch or continuous system.

Catalysts used in the preparation of PTMEG are well known, and include any cationic catalyst, such as strongly acidic cationic exchange resins, fuming sulfuric acids, and boron trifluorides.

The polyol blends of the present invention comprise a difunctional active hydrogen compound-initiated polyoxyalkylene polyether polyol. Difunctional active hydrogen compound-initiated polyoxyalkylene polyether polyols useful in the practice of the invention should have number average molecular weights suitable for the particular application, and generally from 400 to 7000, preferably from 1000 to 6500, more preferably from 1500 to 3500, and most preferably from 2000 to 3000.

The hydroxyl numbers of the polyoxyalkylene polyether polyols used in the invention correspond to the desired number average molecular weight by the formula:

OH=(f) 56,100/equivalent weight

For most applications, suitable hydroxyl numbers for the polyoxyalkylene polyether polyol ranges from 15 to 250, and most often from 25 to 120.

The polyoxyalkylene polyether polyols used in the invention have a degree of unsaturation of 0.04 milliequivalents KOH/g of polyol or less, preferably 0.03 or less, more preferably 0.02 or less.

The structure of the polyoxyalkylene polyether polyol contains a nucleus of a difunctional active hydrogen compound initiator compound containing at least two hydrogen atoms reactive to alkylene oxides. Specifically, the reactive hydrogen atoms on the initiator compound should be sufficiently labile to open up the epoxide ring of ethylene oxide. The initiator compound has a relatively low molecular weight, generally under 400, more preferably under 150.

Examples of initiator compounds useful in the practice of this invention include, but are not limited to, ethylene glycol, propylene glycol, diethylene glycol, dipropylene glycol, 2,3-butylene glycol, 1,3-butylene glycol, 1,5-pentanediol, 1,6-hexanediol, and the like. Another class of reactive hydrogen compounds that can be used are the alkyl amines and alkylene polyamines having two reactive hydrogen atoms, such as methylamine, ethylamine, propylamine, butylamine, hexylamine, ethylenediamine, diethylenediamine, 1,6-hexanediamine, and the like. It may be necessary to select catalysts or adjust reaction conditions that would allow both primary and secondary amine hydrogens to ring-open the alkylene oxides in order to render the monoamines difunctional. Conversely, it may be necessary to select catalysts or adjust reaction conditions to favor only primary amine hydrogens in order to render the diamines difunctional. Cyclic amines such as piperazine, 2-methylpiperazine, and 2,5-dimethylpiperazine can also be used. Amides constitute a further class of such reactive hydrogen compounds, such as acetamide, succinamide, and benzene sulfonamide. A still further class of such reactive hydrogen compounds are the dicarboxylic acids, such as adipic acid and the like. The initiator can also be one containing different functional groups having reactive hydrogen atoms, also, such as glycolic acid, ethanolamine, and the like.

In one preferred embodiment, the polyoxyalkylene polyether polyols used in the invention contain at least one hydrophobic block made from propylene oxide or a mixture of propylene oxide and other cyclic ethers. Such other cyclic ethers are either of the type that are hydrophobic relative to polyoxyethylene groups; or if of a hydrophilic character, are admixed with propylene oxide only in those relative amounts that will not render the polyol ineffective for its ultimate application. The hydrophobic block may consist of a homoblock of oxypropylene groups or a block of randomly distributed oxypropylene groups and other oxyalkylene groups. As an alternative to or in combination with propylene oxide, butylene oxide may also be used, as it also exhibits hydrophobic properties and yields polyols having a low degree of unsaturation.

The polyether of the invention may also be prepared by the addition reaction between a suitable initiator compound directly or indirectly with a defined amount of propylene oxide to form an internal block of oxypropylene groups, followed by further direct or indirect addition of one or more other oxides.

The polyoxyalkylene polyether polyol may contain only ethylene oxide groups, especially if the molecular weight is below 600. However, it preferably contains from 50 to 100 weight % of oxypropylene groups, preferably from 70 to 96 weight % of oxypropylene groups, based on the weight of all of the cyclic ether groups added.

In one preferred embodiment of the invention, propylene oxide is added to and reacted directly with the initiator compounds through the reactive hydrogen atom sites to form an internal block of polyoxypropylene groups. The structure of such an intermediate compound can be represented according to the following formula:

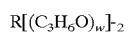

wherein R is the nucleus of the initiator; w is an integer representing the number of oxypropylene groups in the block such that the weight of the oxypropylene groups is from 50 to less than 100 weight percent, (or 100 weight % if one desires to make a polyol based solely on oxypropylene groups and the initiator), based on the weight of all alkylene oxides added; and 2 represents the number of reactive sites on the initiator molecule onto which are bonded the chains of oxypropylene groups.

The polyether polyol may also comprise more than one internal block of oxypropylene groups. By an internal block is meant that the block of oxypropylene groups should be structurally located between the nucleus of the initiator compound and a different block of one or more different kinds of oxyalkylene groups. It is within the scope of the invention to interpose a block of different oxyalkylene groups between the initiator nucleus and the block of oxypropylene groups, especially if the different oxyalkylene groups are also hydrophobic. In one preferred embodiment, however, the internal block of oxypropylene groups is directly attached to the nucleus of the initiator compound through its reactive hydrogen sites.

The polyoxyalkylene polyether polyols used in the invention are terminated with isocyanate reactive hydrogens. The reactive hydrogens may be in the form of primary or secondary hydroxyl groups, or primary or secondary amine groups. In the manufacture of elastomers, it is often desirable to introduce isocyanate reactive groups which are more reactive than secondary hydroxyl groups. Primary hydroxyl groups can be introduced onto the polyether polyol by reacting the growing polyether polymer with ethylene oxide. Therefore, in one preferred embodiment of the invention, the polyoxypropylene polyether polyol is terminated with a terminal block of oxyethylene groups. Alternatively, in another embodiment, the polyether polymer of the invention may be terminated with of a mixture of primary and secondary terminal hydroxyl groups when a mixture of ethylene oxide and, for example, propylene oxide is employed in the manufacture of a terminal cap. Primary and secondary amine groups can be introduced onto the polyether polymer by a reductive amination process as described in U.S. Pat. No. 3,654,370, incorporated herein by reference.

The weight of the terminal block of oxyethylene groups when employed, is at least 4 weight % to 30 weight %, preferably from 10 weight % to 25 weight %, based upon the weight of all compounds added to the initiator.

The method of polymerizing the polyether polymers of the invention is not limited and can occur by anionic, cationic, or coordinate mechanisms.

Methods of anionic polymerization are generally known in the art. Typically, an initiator molecule is reacted with an alkylene oxide in the presence of a basic catalyst, such as an alkoxide or an alkali metal hydroxide. The reaction can be carried out under super atmospheric pressure and an aprotic solvent such as dimethylsulfoxide or tetrahydrofuran, or in bulk.

The type of catalyst used to manufacture the polyoxyalkylene polyether polyol is also not limited so long as the catalyst is of the type that will produce polyoxyalkylene polyether polyols having a degree of unsaturation of 0.04 or less at the desired number average molecular weight. Suitable catalysts include the alkali metal compounds, alkali earth compounds, ammonium, and double metal cyanide catalysts as described in U.S. Pat. No. 3,829,505, incorporated herein by reference, as well as the hydroxides and alkoxides of lithium and rubidium. Other useful catalysts include the oxides, hydroxides, hydrated hydroxides, and the monohydroxide salts of barium or strontium.

Suitable alkali metal compounds include compounds that contain sodium, potassium, lithium, rubidium, and cesium. These compounds may be in the form of alkali metal, oxides, hydroxides, carbonates, salts of organic acids, alkoxides, bicarbonates, natural minerals, silicates, hydrates, etc. and mixtures thereof. Suitable alkali earth metal compounds and mixtures thereof include compounds which contain calcium, strontium, magnesium, beryllium, copper, zinc, titanium, zirconium, lead, arsenic, antimony, bismuth, molybdenum, tungsten, manganese, iron, nickel, cobalt, and barium. Suitable ammonium compounds include, but are not limited to, compounds which contain ammonium radical, such as ammonia, amino compounds, e.g., urea, alkyl ureas, dicyanodiamide, melamine, guanidine, aminoguanidine; amines, e.g., aliphatic amines, aromatic amines; organic ammonium salts, e.g., ammonium carbonate, quaternary ammonium hydroxide, ammonium silicate, and mixtures thereof. The ammonium compounds may be mixed with the aforementioned basic salt-forming compounds. Other typical anions may include the halide ions of fluorine, chlorine, bromine, iodine, or nitrates, benzoates, acetates, sulfonates, and the like.

Of the alkali metals, cesium is the most preferred. Lithium, sodium, and potassium are often not effective at reducing the degree of unsaturation of polyoxyalkylene polyether polyols at the higher equivalent weights. In a preferred embodiment, the polyoxyalkylene polyether polyols are made with a cesium containing catalyst. Examples of cesium-containing catalysts include cesium oxide, cesium acetate, cesium carbonate, cesium alkoxides of the $C_1$–$C_8$ lower alkanols, and cesium hydroxide. These catalysts are effective at reducing the unsaturation of high equivalent weight polyols having a large amount of oxypropylene groups. Unlike double metal cyanide catalysts, which can also be effective at lowering the degree of unsaturation of polyoxyalkylene polyether polyols, the cesium-based catalysts do not have to be removed from the reaction chamber prior to adding an ethylene oxide cap onto a polyether polyol. Thus, the manufacture of a polyoxypropylene polyether polyol having an ethylene oxide cap can proceed throughout the whole reaction with a cesium based catalyst.

The degree of unsaturation can be determined by reacting the polyether polymer with mercuric acetate and methanol in a methanolic solution to release the acetoxymercuric methoxy compounds and acetic acids. Any left over mercuric acetate is treated with sodium bromide to convert the mercuric acetate to the bromide. Acetic acid in the solution can then be titrated with potassium hydroxide, and the degree of unsaturation can be calculated for a number of moles of acetic acid titrated. More specifically, 30 grams of the polyether polymer sample are weighed into a sample flask, and 50 ml of reagent grade mercuric acetate is added to a sample flask and to a blank flask. The sample is stirred until the contents are dissolved. The sample and blank flasks are left standing for thirty (30) minutes with occasional swirling. Subsequently, 8 to 10 grams of sodium bromide are added to each and stirred for two (2) minutes, after which one (1) ml of phenolphthalein indicates is added to each and titrated with standard 1.0N methanolic KOH to a pink endpoint. The degree of unsaturation is calculated and expressed as milliequivalents per gram:

$$\frac{(\text{ml KOH sample - ml KOH blank}) \times N\text{KOH}}{\text{weight of sample}} = \text{Acidity (A) as meq/g}$$

The acidity correction is made only if the acid number of the sample is greater than 0.04, in which case it is divided by 56.1 to give milliequivalents/g.

The reaction conditions can be set to those typically employed in the manufacture of polyoxyalkylene polyether polyols. Generally, from 0.005 percent to about 5 percent, preferably from 0.005 to 2.0 percent, and most preferably from 0.005 to 0.5 percent by weight of the catalyst relative to the polyether polymer is utilized.

Any catalyst left in the polyether polymers produced according to the invention can be neutralized by any of the well-known processes described in the art, such as by an acid, adsorption, water washing, or ion exchange. Examples of acids used in the neutralization technique include solid and liquid organic acids, such as 2-ethylhexanoic acid and acetic acid. For ion exchange, phosphoric acid or sulfuric acid may be used. Extraction or adsorption techniques employ activated clay or synthetic magnesium silicates. It is desirable to remove metal cationic contents down to less than 500 ppm, preferably less than 100 ppm, most preferably from 0.1 to 5 ppm.

As for other processing conditions, the temperature at which polymerization of the polyether polymers occurs generally ranges from 80° C. to 160° C., preferably from 95° C. to 115° C. The reaction can be carried out in a columnar reactor, a tube reactor, or batchwise in an autoclave. In the batch process, the reaction is carried out in a closed vessel under pressure which can be regulated by a pad of inert gas and the feed of alkylene oxides into the reaction chamber. Generally, the operating pressures produced by the addition of alkylene oxide range from 10 to 50 psig. Generating a pressure over 100 psig increases the risk of a runaway reaction. The alkylene oxides can be fed into the reaction vessel as either a gas or a liquid. The contents of the reaction vessel are vigorously agitated to maintain a good dispersion of the catalyst and uniform reaction rates throughout the mass. The course of polymerization can be controlled by consecutively metering in each alkylene oxide until a desired amount has been added. Where a block of a random or a statistical distribution of alkylene oxides are desired in the polyether polymer, the alkylene oxides may be metered into the reaction vessel as mixtures. Agitation of the contents in the reactor at the reaction temperature is continued until the pressure falls to a low value. The final reaction product may then be cooled, neutralized as desired, and removed.

The polyol composition of the invention may include additional polyols in addition to the PTMEG and the above-described polyether polyol. For example, polyols of other functionalities, i.e., greater than 2, may be included. Such polyols may be prepared as described above, except that an initiator of higher functionality is used, such as glycerol, trimethylol propane, pentaerythritol, sorbitol, sucrose, and the like, and amines such as ethylenediamine, toluenediamine, and the like. Higher functional polyols may be incorporated either by physical blending of the finished polyols or by including a higher-functional initiator in a mixture with the above-described difunctional initiator prior to reaction with alkylene oxide(s). Thus, a mixture of initiator compounds may be used to adjust the functionality of the initiator to a number between whole numbers. If one desires to manufacture an elastomer having only a slight degree of crosslinking, a high proportion of an initiator having a functionality of 2, to which is added relatively small amounts of tri- or higher functional initiator compounds, may be mixed together to arrive at an initiator having an average functionality close to 2 and up to 2.3. On the other hand, a larger proportion of tri- or higher functional initiator compounds can be mixed with a di-functional initiator compound when a higher degree of crosslinking is desired.

Other types of polyol may also be included in the polyol composition of the invention. For example, polyester polyols may be added to improve certain mechanical properties of an elastomer such as tensile strength and modulus of the urethane polymer. For some elastomeric applications, however, it is preferred to use only polyether polyols because they can be more hydrolytically stable than polyester polyols, and they process well due to their lower viscosities. Other polyols that can be employed in addition to the polyoxyalkylene polyether polymers of the invention are hydroxyl terminated hydrocarbons, such as polybutadiene polyols, where a high degree of hydrophobicity is desired. Castor oils and other natural oils may also be employed. In addition, polycaprolactones can be used to increase the tensile strengths of elastomers. Other polyether polyols may be added, and it is preferred that these polyether polyols have a low degree of unsaturation to optimize the mechanical properties of the product.

Other ingredients in the polyol composition, besides the PTMEG and the polyoxyalkylene polyether polyol, may include other polyols, chain extenders or curing agents, catalysts, fillers, pigments, UV stabilizers, and the like.

The above-described components of the polyol composition can be blended together with standard mixing techniques, preferably in a PTMEG:polyether polyol weight ratio of from 20:80 to 95:5, although ratios of greater than 95:5 may also be useful. If either of the components (A) or (B) are solid, they should be liquified, preferably by melting, prior to mixing. Preferably, the polyol composition of the invention should form a homogeneous blend without visual phase separation. It may be necessary to adjust the relative molecular weights of either or both of the components (A) and (B) in order to achieve a homogeneous blend.

Depending upon the application of the elastomer, the average actual functionality of the blend should be from 1.5 to 3.0, preferably from 1.95 to 2.3, and as low as 1.95 to 2.1. In these embodiments, polyols having functionalities outside of these ranges can be used so long as the average functionality falls within the range. In one embodiment that is preferred for certain applications, the functionality of the blend should be maintained at 3.0 or less to avoid losing too much elongation, a desirable feature for certain elastomeric applications. In applications where high hardness, high tensile strength, and low elongations are desired, it may be desirable for the actual average functionality of the blend to exceed 3.0. For most elastomer applications, the mean number average molecular weight for the polyol composition of the invention can range from 500 to 4000, preferably from 900 to 3000.

One-component elastomers can be cured by moisture from the air. Two-component elastomers can be cured along with chain extenders with compounds containing isocyanate reactive hydrogen. These chain extenders may be contained in the polyol composition. Elastomers may be prepared using the one-shot technique or the prepolymer technique. If the prepolymer technique is used, the polyol composition will usually be free of a chain extender during the manufacture of the prepolymer. The prepolymer is then reacted with any remaining polyol composition which at that point contains a chain extender. In the one-shot process, the polyisocyanate is reacted at the outset with a polyol composition containing the chain extender.

Chain extenders may be, and are typically, employed in the preparation of polyurethane elastomers. The term "chain extender" is used to mean a relatively low equivalent weight compound, usually less than about 250 equivalent weight, preferably less than 100 equivalent weight, having a plurality of isocyanate-reactive hydrogen atoms. Chain-extending agents can include water, hydrazine, primary and secondary aliphatic or aromatic diamines, amino alcohols, amino acids, hydroxy acids, glycols, or mixtures thereof. A preferred group of alcohol chain-extending agents includes water, ethylene glycol, 1,3-propanediol, 1,4-butanediol, 1,10-decanediol, o,-m,-p-dihydroxycyclohexane, diethylene glycol, 1,6-hexanediol, glycerine, trimethylol propane, 1,2, 4-, 1,3,5-trihydroxycyclohexane, and bis(2-hydroxyethyl) hydroquinone. A preferred group of amine chain extenders includes 1,3-diaminocyclohexane, piperazine, ethylenediamine, propylenediamine, and mixtures thereof.

Examples of secondary aromatic diamines include N,N'-dialkyl-substituted aromatic diamines, which may be unsubstituted or substituted on the aromatic radical by alkyl radicals, having 1 to 20, preferably 1 to 4, carbon atoms in the N-alkyl radical, e.g., N,N'-diethyl-, N,N'-di-sec-pentyl-, N,N'-di-sec-hexyl-, N,N'-di-sec-decyl-, and N,N'-dicyclohexyl-p- and m-phenylenediamine, N,N'-dimethyl-, N,N'-diethyl-, N,N'-diisopropyl-, N,N,'-disec-butyl- and N,N'-dicyclohexyl-4,4'-diaminodiphenylmethane and N,N'-di-sec-butylbenzidine.

The amount of chain extender used may vary depending on the desired physical properties of the elastomer. A higher proportion of chain extender and isocyanate provides the elastomer with a larger number of hard segments, resulting in an elastomer having greater stiffness and heat distortion temperature. Lower amounts of chain extender and isocyanate result in a more flexible elastomer. Generally, about 2 to 70,, preferably about 10 to 40, parts of the chain extender may be used per 100 parts of polyether polymer and PTMEG and any other higher molecular weight isocyanate reactive components.

Catalysts may be employed to accelerate the reaction of the compounds containing hydroxyl groups with polyisocyanates. Examples of suitable compounds are cure catalysts which also function to shorten tack time, promote green strength, and prevent shrinkage. Suitable cure catalysts include organometallic catalysts, preferably organotin catalysts, although it is possible to employ metals such as lead, titanium, copper, mercury, cobalt, nickel, iron, vanadium, antimony, and manganese. Suitable organometallic catalysts, exemplified here by tin as the metal, are represented by the formula: $R_nSn[X—R^1—Y]_2$, wherein R is a $C_1-C_8$ alkyl or aryl group, $R^1$ is a $C_0-C_{18}$ methylene group optionally substituted or branched with a $C_1-C_4$ alkyl group, Y is hydrogen or an hydroxyl group, preferably hydrogen, X is methylene, an —S—, an —$SR^2COO$—, —SOOC—, an —$O_3S$—, or an —OOC— group wherein $R^2$ is a $C_1-C_4$ alkyl, n is 0 or 2, provided that $R^1$ is $C_0$ only when X is a methylene group. Specific examples are tin (II) acetate, tin (II) octanoate, tin (II) ethylhexanoate and tin (II) laurate; and dialkyl (1–8 C) tin (IV) salts of organic carboxylic acids having 1–32 carbon atoms, preferably 1–20 carbon atoms, e.g., diethyltin diacetate, dibutyltin diacetate, dibutyltin diacetate, dibutyltin dilaurate, dibutyltin maleate, dihexyltin diacetate, and dioctyltin diacetate. Other suitable organotin catalysts are organotin alkoxides and mono or polyalkyl ($C_1-C_8$) tin (IV) salts of inorganic compounds such as butyltin trichloride, dimethyl- and diethyl- and dibutyl- and dioctyl- and diphenyl- tin oxide, dibutyltin dibutoxide, di(2-ethylhexyl) tin oxide, and dibutyltin dichloride. Preferred, however, are tin catalysts with tin-sulfur bonds which are resistant to hydrolysis, such as dialkyl ($C_1-C_{20}$) tin dimercaptides, including dimethyl-, dibutyl-, and dioctyl-tin dimercaptides.

Tertiary amines also promote urethane linkage formation, and include triethylamine, 3-methoxypropyldimethylamine, triethylenediamine,, tributylamine, dimethylbenzylamine, N-methyl-, N-ethyl- and N-cyclohexylmorpholine, N,N,N', N'-tetramethylethylenediamine, N,N,N',N'-tetramethylbutanediamine or N,N,N',N'-tetramethylhexanediamine, N,N,N'-trimethyl isopropyl propylenediamine, pentamethyldiethylenetriamine, tetramethyldiaminoethyl ether, bis(dimethylaminopropyl)urea, dimethylpiperazine, 1-methyl-4-dimethylaminoethylpiperazine, 1,2-dimethylimidazole, 1-azabicylo[3.3.0]octane and preferably 1,4-diazabicylo[2.2.2]octane, and alkanolamine compounds, such as triethanolamine, triisopropanolamine, N-methyl- and N-ethyldiethanolamine and dimethylethanolamine.

To prevent the entrainment of air bubbles in the sealants or elastomers, a batch mixture may be subjected to degassing at a reduced pressure once the ingredients are mixed together. In the degassing method, the mixed polyurethane formed ingredients can be heated under vacuum to an elevated temperature to react out or volatilize residual water. By heating to an elevated temperature, residual water reacts with the isocyanate to liberate carbon dioxide, which is drawn from the mixture by the reduced pressure.

Alternatively, or in addition to the degassing procedure, the polyurethane forming ingredients may be diluted with solvents to reduce the viscosity of the polyurethane forming mixture. Such solvents should be nonreactive and include tetrahydrofuran, acetone, dimethylformamide, dimethylacetamide, normal methylpyrrolidone, methyl ethyl ketone, etc. The reduction in viscosity of polyurethane forming ingredients aid their extrudability. For sealant applications, however, the amount of solvent should be kept as low as possible to avoid deteriorating their adhesion to substrates. Other solvents include xylene, ethyl acetate, toluene, and cellosolve acetate.

Plasticizers may also be included in the A- or B-side components to soften the elastomer and decrease its brittleness temperature. Examples of plasticizers include the dialkyl phthalates, dibutyl benzyl phthalate, tricresyl phosphate, dialkyl adipates, and trioctylphosphate.

In addition to solvents or plasticizers, other ingredients such as adhesion promoters, fillers, and pigments, such as clay, silica, fume silica, carbon black, talc, phthalocyanine blue or green, titanium oxide, magnesium carbonate, calcium carbonate, UV-absorbers, antioxidants, and HALS may be added in amounts ranging from 0 to 75 weight percent, based upon the weight of the polyurethane. Other fillers include dissolved gels, plasticells, graded and coated calcium carbonate, urea solids, the reaction product of hydrogenated castor oils with amines, and fibers.

The polyurethane elastomers of the invention can be prepared by the prepolymer technique or in a one-shot process. The elastomers of the invention can be prepared by a reaction injection molding technique, or in a cast process wherein the polyurethane forming ingredients are mixed together and poured into a heated mold into pressure. Other techniques include conventional hand-mixed techniques and low pressure or high pressure impingement machine mixing techniques followed by pouring polyurethane forming ingredients into molds.

In a one-shot process, the PTMEG and the polyoxyalkylene polyether polyol of the invention, catalysts, and other isocyanate reactive components forming the polyol composition (also known as "B-side" components) are simultaneously reacted with an organic isocyanate ("A-side" components). Once the B-side components are mixed together, the urethane reaction commences; and the ingredients are poured or injected into molds to make cast elastomers, or may be extruded or spun to make thermoplastic polyurethane or spandex fiber.

In a prepolymer technique, all or a portion of the PTMEG and the polyoxyalkylene polyether polyol having an end group degree of unsaturation of 0.04 or less, and any other isocyanate reactive polyols in the polyol composition, and usually without any chain extender, are reacted with a stoichiometric excess of the organic isocyanate to form an isocyanate-terminated prepolymer. Such prepolymers usually have free NCO contents of 0.5 to 30 weight %, and for many elastomeric applications, have free NCO contents of from 1 to 15 weight %. The isocyanate-terminated prepolymer is then reacted as an A-side component with any remaining B-side components to form a polyurethane elastomer. In some cases, all of the B-side components are in the form of an active hydrogen-terminated prepolymer. In other cases, only a portion of the polyol composition is reacted with the stoichiometric excess of organic isocyanate to form an isocyanate terminated prepolymer, which is subsequently reacted with the remainder of the polyol composition, as a two-component elastomer. An isocyanate-terminated prepolymer is usually reacted with the isocyanate reactive functionalities in the polyol composition at an NCO to OH equivalent ratio of at least 1.5:1.

Alternatively, an active hydrogen-terminated prepolymer can be prepared if all or a portion of the PTMEG and the polyoxyalkylene polyether polyol having an end group degree of unsaturation of 0.04 or less, and any other isocyanate reactive polyols in the polyol composition, and usually without any chain extender, are reacted with a stoichiometric deficiency of the organic isocyanate to form an active hydrogen-terminated prepolymer. The prepolymer is then reacted as a B-side component with A-side components to form a polyurethane elastomer.

In one embodiment of the invention, there is manufacture of a spandex fiber using the blends of the invention. Spandex is, by definition, a hard-segment/soft-segment-containing, urethane-containing polymer composed of at least 85% by weight of a segmented polyurethane (or urea). The term "segmented" refers to alternating soft and hard regions within the polymer structure.

Spandex is typically produced using one of four different processes: melt extrusion, reaction spinning, solution dry spinning, and solution wet spinning. All processes involve differing practical applications of basically similar chemistry. In general, a block copolymer is prepared by reacting a diisocyanate with the polyol composition of the invention in a molar ratio of about 1:2 and then chain extending the prepolymer with a low molecular weight diol or diamine near stoichiometry equivalence. If the chain extension is carried out in a solvent, the resulting solution may be wet- or dry-spun into fiber. The prepolymer may be reaction-spun by extrusion into an aqueous or non-aqueous diamine bath to begin polymerization to form a fiber or the prepolymer may be chain extended with a diol in bulk and the resulting block copolymer melt-extruded in fiber form. Melt spinning is conducted in a manner similar to the melt extrusion of polyolefins. Reaction spinning is typically carried out after reacting the polyol composition with a diisocyanate to form a prepolymer. The prepolymer is then extruded into a diamine bath where filament and polymer formation occur simultaneously, as described in more detail in U.S. Pat. No. 4,002,711.

In another embodiment of the invention, there is provided a thermoplastic polyurethane (TPU) elastomer made with the blends of the invention. TPU is made by reacting a polyol composition comprising PTMEG and a polyoxyalkylene polyether diol having a low degree of unsaturation with and organic diisocyanate to form a linear polymer structure. While other polyols with higher functionalities than 2 can be combined with the diol, these should be used in minor amounts if at all. It is preferable that the functionality of the initiators used to make the polyoxyalkylene polyether polyols is 2, and that no initiators having functionalities of over or under 2 are used, in order to make the polymer chain linear. The same type of chain extenders as described above can be used, with the preferable chain extenders being the difunctional glycols.

The reaction may be carried out in a one shot process or by the prepolymer technique. In the one shot process, the raw ingredients are fed into the reaction zone of an extruder, heated at a temperature effective for polymerization to occur, extruded onto a conveyor belt, and pelletized. The prepolymer technique is similar except that the prepolymer and chain extender are the materials fed into the reaction zone of the extruder. The type of extruder employed is not limited. For example, either twin or single screw extruders can be used.

The following examples further describe the invention.
Materials

Polyol A is a propylene glycol adduct of propylene oxide and ethylene oxide having a 20 weight percent terminal cap of polyoxyethylene groups and an internal block of polyoxypropylene groups, having a molecular weight of about 3000, and a degree of unsaturation of 0.069, manufactured using KOH as a polymerization catalyst.

Polyol B is a propylene oxide-ethylene oxide adduct of propylene glycol having a terminal cap of 20 weight percent polyoxyethylene groups and a molecular weight of 3000, manufactured using cesium hydroxide as a polymerization catalyst, with a degree of unsaturation of 0.025.

Polyol C is a propylene oxide-ethylene oxide adduct of propylene glycol having a 20 weight percent terminal cap of polyoxyethylene groups and a molecular weight of 2500, manufactured using cesium hydroxide as a polymerization catalyst to a degree of unsaturation of 0.016.

Polyol D is a propylene oxide-ethylene oxide adduct of propylene glycol having a 20 weight percent terminal cap of polyoxyethylene groups and a molecular weight of 1250, manufactured using cesium hydroxide as a polymerization catalyst to a degree of unsaturation of 0.008 milliequivalents KOH/g polyol.

PTMEG is a polytetramethylene ether glycol manufactured from tetrahydrofuran to the designated molecular weight.

EXAMPLES 1–12

In these Examples, the compression sets of cast elastomers made using blends of PTMEG and polyether polyols having a high degree of unsaturation exceeding 0.04 were compared against blends of PTMEG and polyether polyols having degrees of unsaturation of 0.04 or less.

Diphenylmethane diisocyanate was reacted with the blends of polyether polyols in the kinds and amounts stated in Table 1 below, to a six (6) percent free NCO content. The prepolymers were then reacted with 1,4-butanediol chain extender and cast into ¼-inch plaques in a mold. Each plaque was allowed to heat cure and was then subjected to analysis. The modulus was tested according to ASTM D790, the tensile strength and elongation percent according to ASTM D412, the Graves tear according to ASTM 624, using Die C, the resilience percent according to ASTM 2632-79, and a compression set according to ASTM D395 at 25 percent deformation.

The next two Tables (2 and 3) illustrate the retention of compression sets across the board from 0 to 30 weight percent of the low unsaturation polyether polyol blended with PTMEG. Table 2 illustrates the physical properties of cast elastomers made by the same process, according to Example 1, also using a PTMEG/Polyol B blend. Table 3 illustrates the same process, except using PTHF 2500/Polyol C blends. Table 4 illustrates the physical properties of cast elastomers made by the same process, using PTHF 1000/Polyol D blends.

TABLE 1

| Example | PTMEG 2000 | MOD 100% | TEN-SILE | ELONG. % | TEAR | RESILIENCE | COMP. SET | SHORE |
|---|---|---|---|---|---|---|---|---|
| 1 | 80/20 POLYOL B | 1050 | 2449 | 410 | 441 | 58 | 26 | 88 |
| Comparison A | 80/20 POLYOL A | 869 | 2443 | 599 | 440 | 55 | 49 | 76 |
| 2 | 70/30 POLYOL B | 990 | 2162 | 427 | 454 | 56 | 29 | 87 |
| Comparison B | 70/30 POLYOL A | 850 | 1894 | 505 | 366 | 52 | 73 | 78 |

TABLE 2

|  | Comparison C | Example 3 | Example 4 | Example 5 | Example 6 |
|---|---|---|---|---|---|
| MODULUS | 100/0 | 95/5 | 90/10 | 80/20 | 70/30 |
| 100% | 1059 | 1034 | 985 | 904 | 857 |
| 300% | 1812 | 1613 | 1675 | 1360 | 1224 |
| TENSILE | 2767 | 2465 | 2822 | 1848 | 1501 |
| ELONG. % | 468 | 556 | 513 | 494 | 450 |
| TEAR (GRAVES) | 502 | 509 | 458 | 460 | 375 |
| SHORE A | 81 | 83 | 80 | 80 | 82 |
| RESI-LIENCE % | 58 | 61 | 26 | 60 | 49 |
| COMP. SET 25% | 21 | 14 | 9.1 | 20.2 | 28.2 |

TABLE 3

|  | Comparison D | Example 7 | Example 8 | Example 9 | Example 10 |
|---|---|---|---|---|---|
| MODULUS | 100/0 | 95/5 | 90/10 | 80/20 | 70/30 |
| 100% | 1059 | 1000 | 953 | 943 | 827 |
| 300% | 1812 | 1678 | 1601 | 1532 | 1367 |
| TENSILE | 2767 | 2450 | 2461 | 2318 | 2035 |
| ELONG. % | 468 | 481 | 517 | 507 | 517 |
| TEAR (GRAVES) | 502 | 489 | 459 | 449 | 392 |
| SHORE A | 81 | 80 | 79 | 81 | 79 |
| RESI-LIENCE % | 58 | 60 | 60 | 58 | 61 |
| COMP. SET 25% | 21 | 14.9 | 20.2 | 19.5 | 33 |

TABLE 4

|  | Comparison E | Example 11 | Example 12 | Example 13 | Example 14 | Example 15 |
|---|---|---|---|---|---|---|
| PROPERTY MODULUS | 100/0 | 90/10 | 80/20 | 70/30 | 60/40 | 50/50 |
| 100% | 1281 | 1117 | 1098 | 984 | 888 | 726 |
| 200% | 1872 | 1646 | 1562 | 1421 | 1249 | 978 |
| TENSILE | 2650 | 2734 | *2748 | 2753 | 2324 | 2238 |
| ELONGATION | 278 | 333 | *351 | 386 | 392 | 513 |
| TEAR (GRAVES) | 414 | 359 | 347 | 345 | 325 | 337 |
| SHORE A | 92 | 89 | 90 | 90 | 88 | 90 |
| RESILIENCE | 52 | 52 | 49 | 46 | 41 | 44 |
| COMP. SET % | 22 | 24 | 25 | 24 | 38 | 47 |

The results in Table 1 show that blends of PTMEG made with conventional polyether polyols using standard potassium hydroxide catalysts with relatively high levels of unsaturation drastically increased the compression set up to 49, with severe increases in compression sets at 70/30 weight ratios. In contrast, the compression set of PTMEG/polyether polyols with low degrees of unsaturation retained significantly low compression sets and kept the reduced compression sets even as the amount of low unsaturation polyether polyol was increased to 30 weight percent. The compression set at 25% deflection does not deviate by more than +/−15 when compared to an equivalent elastomer made at the same free NCO content using only polytetramethylene ether glycol as the polyol and the polyol composition. This was accomplished without significant reductions in other physical properties, such as Shore A hardness, tensile strength, modulus, and tear strength.

The results in each of Tables 2–4 illustrates that cast elastomers made with polyether polyols having low degrees of unsaturation can be used and blended with PTMEG without sacrificing the compression sets of the elastomers. Elongation was generally improved with polyol compositions according to the invention, and certain samples also demonstrated improved resilience. Furthermore, other physical properties such as modulus, tensile strength, and tear strength were not sacrificed and are adequately maintained throughout the wide range of blend ratios.

The invention has been described in detail with reference to preferred embodiments thereof. It should be understood, however, that variations and modifications can be made within the spirit and scope of the invention.

What is claimed is:

1. A prepolymer comprising the reaction product of a polyisocyanate with a polyol composition wherein the polyol composition comprises:
   a polyoxytetramethylene ether glycol, and
   a difunctional active hydrogen compound-initiated polyoxyalkylene polyether polyol containing at least one hydrophobic block made from propylene oxide or a mixture of propylene oxide and other cyclic ethers, said polyoxyalkylene polyether polyol having a degree of unsaturation of not greater than 0.04 milliequivalents per gram of said polyether polyol and a terminal group comprised of isocyanate reactive hydrogens, wherein the weight ratio of said polyoxytetramethylene ether glycol to said polyoxyalkylene polyether polyol ranges from about 99:1 to about 70:30 and wherein said polyol is capped with oxyalkylene groups derived from ethylene oxide in an amount of from 4 weight percent to 30 weight percent, based on the weight of all oxyalkylene groups.

2. A prepolymer according to claim 1 wherein said prepolymer is a hydroxyl terminated prepolymer obtained by reacting a stoiciometric excess of the polyol composition with the polyisocyanate.

3. A prepolymer according to claim 1, wherein said prepolymer is an isocyanate terminated prepolymer having a free NCO content of 0.5 weight percent to 30 weight percent.

4. An elastomer comprising the reaction product of a mixture comprising:
   (A) a polyisocyanate,
   (B) a polyol composition, and
   (C) optionally, an active hydrogen chain extender, wherein said polyol composition comprises:
      (1) a polyoxytetramethylene ether glycol, and
      (2) a difunctional active hydrogen compound-initiated polyoxyalkylene polyether polyol containing at least one hydrophobic block made from propylene oxide or a mixture of propylene oxide and other cyclic ethers, said polyoxyalkylene polyether polyol having a degree of unsaturation of not greater than 0.04 milliequivalents per gram of said polyether polyol and a terminal group comprised of isocyanate reactive hydrogens, and wherein the weight ratio of said polyoxytetramethylene ether glycol to said polyoxyalkylene polyether polyol ranges from about 99:1 to about 70:30 and wherein said polyol is capped with oxyalkylene groups derived from ethylene oxide in an amount of from 4 weight percent to 30 weight percent, based on the weight of all oxyalkylene groups.

5. An elastomer as recited in claim 4, wherein the number average molecular weight of the polyol composition ranges from 1000 to 4500.

6. An elastomer as recited in claim 4, wherein the average functionality of the polyol composition ranges from 1.97 to 2.1.

7. An elastomer as recited in claim 4, wherein said polyether polyol has a degree of unsaturation of not greater than 0.03 milliequivalents per gram of said polyether polyol.

8. An elastomer as recited in claim 4, wherein said polyether polyol has a degree of unsaturation of not greater than 0.015 milliequivalents per gram of said polyether polyol.

9. An elastomer comprising the reaction product of a mixture comprising:
   (A) an isocyanate-terminated prepolymer having a free NCO content of 0.5 weight percent to 30 weight percent,
   (B) an active hydrogen chain extender, and
   (C) optionally, a polyisocyanate different from said prepolymer,
   said prepolymer comprising the reaction product of a polyisocyanate with a polyol composition, wherein said polyol composition comprises:
      (1) a polyoxytetramethylene ether glycol, and
      (2) a difunctional active hydrogen compound-initiated polyoxyalkylene polyether polyol containing at least one hydrophobic block made from propylene oxide or a mixture of propylene oxide and other cyclic ethers, said polyoxyalkylene polyether polyol having a degree of unsaturation of not greater than 0.04 milliequivalents per gram of said polyether polyol and a terminal group comprised of isocyanate reactive hydrogens, and wherein the weight ratio of said polyoxytetramethylene ether glycol to said polyoxyalkylene polyether polyol ranges from about 99:1 to about 70:30 and wherein said polyol is capped with oxyalkylene groups derived from ethylene oxide in an amount of from 4 weight percent to 30 weight percent, based on the weight of all oxyalkylene groups.

10. An elastomer as recited in claim 9, wherein the number average molecular weight of the polyol composition ranges from 1000 to 4500.

11. An elastomer as recited in claim 9, wherein the average functionality of the polyol composition ranges from 1.97 to 2.1.

12. An elastomer as recited in claim 9, wherein said polyether polyol has a degree of unsaturation of not greater than 0.03 milliequivalents per gram of said polyether polyol.

13. An elastomer as recited in claim 9, wherein said polyether polyol has a degree of unsaturation of not greater than 0.015 milliequivalents per gram of said polyether polyol.

14. An elastomer comprising the reaction product of a mixture comprising:
   (A) a hydroxyl-terminated prepolymer,
   (B) a polyisocyanate, and
   (C) optionally, an active hydrogen chain extender,
   said prepolymer comprising the reaction product of a polyol composition in a stoichiometric excess with a polyisocyanate, wherein said polyol composition comprises:
      (1) a polyoxytetramethylene ether glycol, and
      (2) a difunctional active hydrogen compound-initiated polyoxyalkylene polyether polyol containing at least one hydrophobic block made from propylene oxide or a mixture of propylene oxide and other cyclic ethers, said polyoxyalkylene polyether polyol having a degree of unsaturation of not greater than 0.04 milliequivalents per gram of said polyether polyol and a terminal group comprised of isocyanate reactive hydrogens, and wherein the weight ratio of said polyoxytetramethylene ether glycol to said polyoxyalkylene polyether polyol ranges from about 99:1 to about 70:30 and wherein said polyol is capped with oxyalkylene groups derived from ethylene oxide in an amount of from 4 weight percent to 30 weight percent, based on the weight of all oxyalkylene groups.

15. An elastomer as recited in claim 14, wherein the number average molecular weight of the polyol composition ranges from 1000 to 4500.

16. An elastomer as recited in claim 14, wherein the average functionality of the polyol composition ranges from 1.97 to 2.1.

17. An elastomer as recited in claim 14, wherein said polyether polyol has a degree of unsaturation of not greater than 0.03 milliequivalents per gram of said polyether polyol.

18. An elastomer as recited in claim 14, wherein said polyether polyol has a degree of unsaturation of not greater than 0.015 milliequivalents per gram of said polyether polyol.

19. A prepolymer comprising the reaction product of a polyisocyanate with a polyol composition wherein the polyol composition comprises:

(A) a polytetramethylene ether glycol, and (B) a difunctional active hydrogen compound-initiated polyoxyalkylene polyether polyol containing at least one hydrophobic block made from propylene oxide or a mixture of propylene oxide and other cyclic ethers, said polyoxyalkylene polyether polyol having a degree of unsaturation of not greater than 0.01 milliequivalents per gram of said polyether polyol and a terminal group comprised of isocyanate reactive hydrogens, wherein the weight ratio of said polytetramethylene ether glycol to said polyoxyalkylene polyether polyol ranges from about 99:1 to about 50:50 and wherein said polyol is capped with oxyalkylene groups derived from ethylene oxide in an amount of from 4 weight percent to 30 weight percent, based on the weight of all oxyalkylene groups.

20. An elastomer comprising the reaction product of a mixture comprising:

(A) a polyisocyanate, (B) a polyol composition, and (C) optionally, an active hydrogen chain extender, wherein said polyol composition comprises (1) a polytetramethylene ether glycol, and (2) a difunctional active hydrogen compound-initiated polyoxyalkylene polyether polyol containing at least one hydrophobic block made from propylene oxide or a mixture of propylene oxide and other cyclic ethers, said polyoxyalkylene polyether polyol having a degree of unsaturation of not greater than 0.01 milliequivalents per gram of said polyether polyol and a terminal group comprised of isocyanate reactive hydrogens, and wherein the weight ratio of said polytetramethylene ether glycol to said polyoxyalkylene polyether polyol ranges from about 99:1 to about 50:50 and wherein said polyol is capped with oxyalkylene groups derived from ethylene oxide in an amount of from 4 weight percent to 30 weight percent, based on the weight of all oxyalkylene groups.

* * * * *